United States Patent
Silvera et al.

(10) Patent No.: US 8,327,096 B2
(45) Date of Patent: Dec. 4, 2012

(54) METHOD AND SYSTEM FOR EFFICIENT IMAGE CUSTOMIZATION FOR MASS DEPLOYMENT

(75) Inventors: Ezra Silvera, Nesher (IL); Dean Lorenz, Haifa (IL); Inbar Shapira, Givat Ada (IL); Gilad Sharaby, Alon Hagalil (IL)

(73) Assignee: International Business Machines Corporation, Armonk, NY (US)

( * ) Notice: Subject to any disclaimer, the term of this patent is extended or adjusted under 35 U.S.C. 154(b) by 1010 days.

(21) Appl. No.: 12/347,120

(22) Filed: Dec. 31, 2008

(65) Prior Publication Data
US 2010/0169881 A1    Jul. 1, 2010

(51) Int. Cl.
*G06F 12/00* (2006.01)
*G06F 9/455* (2006.01)
(52) U.S. Cl. .......................................... 711/162; 718/1
(58) Field of Classification Search .................. 711/162; 718/1
See application file for complete search history.

(56) References Cited

U.S. PATENT DOCUMENTS
2010/0037207 A1* 2/2010 Chambers et al. ............ 717/121
* cited by examiner

*Primary Examiner* — Yong Choe
(74) *Attorney, Agent, or Firm* — Scully, Scott, Murphy & Presser, P.C.; Suzanne Erez, Esq.

(57) ABSTRACT

A system and method for creating N customized disk images from N identical disk images. A computing system creates N identical disk images from a master image. The computing system customize a first identical disk image according to a customization written in customization scripts. While customizing the first identical disk image, the computing system monitors block-level operations applied on the first identical disk image. The computing system applies the monitored block-level operations simultaneously to other N−1 identical disk according to similar customizations written in customization scripts. After applying the block-level operations, the N identical disk images become N customized disk images. Identical Virtual Machines (VMs) operating in the N identical disk images become N customized VMs by operating based on the N customized disk images.

22 Claims, 3 Drawing Sheets

METHOD AND SYSTEM FOR EFFICIENT IMAGE CUSTOMIZATION FOR MASS DEPLOYMENT

BACKGROUND OF THE INVENTION

1. Field of the Invention

This invention generally relates to a disk image, and more particularly relates to creating N customized disk images from a master disk image. The invention also relates to a virtual machine, and more particularly relates to creating N customized virtual machines.

2. Background Art

A disk image refers to a single file storing complete contents (e.g., programs, applications, OS, etc.) and data structure installed in a storage device or medium such as a hard drive, CD or DVD. A disk image can be created by sector-by-sector copy of a source storage device, and thereby perfectly replicate the data structure and the contents of the source storage device.

A virtual machine refers to a software implementation of a machine that executes programs like a real machine and, includes system and/or platform virtual machines (for example a Xen domU type of platform virtualization, or a VMWare virtual machine).

A master disk image refers to a template disk image or an original disk image from which identical disk images are created.

Currently, in CoW (Copy-On-Write) techniques employed when multiple users ask for resources which are initially indistinguishable, the computing system may provide them with pointers to a same resource. However, when a user tries to modify a copy of the resource, the computing system creates a private copy to prevent changes becoming visible to everyone else. A primary advantage of the CoW is that if a user never makes any modification to a copy of the resource, no private copy is created.

To perform a customization (e.g., changing files) in a disk image, a traditional solution first creates an identical disk image from the master disk image, e.g., by copying the master image. Then, the traditional solution performs a customization on the identical disk image by booting the identical disk image and executing the customization within a virtual machine. In this traditional solution, a system administrator manually logs into the executing virtual machine to enable the virtual machine to perform specific operations (e.g., running some software applications) to perform the customization.

In another traditional solution, a system administrator "mounts" a file system on the identical disk image. This traditional solution requires information about a format or structure of the file system. This traditional solution interprets the file system structure and allows manipulation of a file inside the identical disk image to create a customized disk image. "Mounting" the file system refers to making the file system ready for use by an operating system, e.g., by reading certain data structure from the identical disk image to a memory device. In this traditional solution, the mounting is executed from another machine which is not associated with the identical disk image (e.g., a virtual machine not booted from the identical disk image).

However, these traditional solutions treats each customized disk image creation as an independent task. Thus, creating customized disk images becomes a time-consuming and complicated task. Hence, it is highly desirable to provide a system or a method for mass customization of identical disk images without treating each customization as an independent task.

SUMMARY OF THE INVENTION

The present invention provides a system and a method for creating N (N≧2) customized disk images from the same master disk image.

In one embodiment, there is provided a method for creating N customized disk images comprising:
creating N identical disk images from a master disk image;
applying customizations to a created first identical disk image among the N identical disk images according to one or more customization scripts describing the customizations;
monitoring and saving block-level operations performed on the first identical disk image while applying the customizations to the first identical disk image; and,
re-using the monitored and saved block-level operations for concurrent or simultaneous application to other N−1 identical disk images to be similarly customized,
wherein the N identical disk images becomes the N customized disk images after performing the customizations and the similar customizations.

Further to this embodiment, the method further comprises:
receiving the one or more customization scripts from a user, wherein the applying customizations comprises:
analyzing the first identical image once, the analyzing comprising:
parsing a customization request;
searching and locating texts associated with the parsed customization request in the first identical disk image;
determining operations to be applied on a specific location in the identical disk image; and,
saving any data regarding the operations to be applied in a memory storage device for later re-use.

In a further aspect of the invention, the method further comprises: modifying the one or more customization scripts to be executed simultaneously on the N identical images by re-using the monitored and saved block-level operations.

In a further aspect of the invention, the creating N identical disk images comprises: performing a CoW (Copy-On-Write) operation optimized for creating the N identical disk images.

In a further aspect of the invention, the monitored and saved block-level operations includes one or more of:
a file offset within a file system in the first identical disk image, the file offset indicating a specific location in the file system where the customizations applied;
an i-node identity corresponding to the specific location where the customization applied; and
a block offset in the first identical disk image, the block offset indicating a particular location where the customization applied.

In a further embodiment, there is provided a system for creating N customized disk images comprising:
means for creating N identical disk images from a master disk image;
means for applying customizations to a first identical disk image among the N identical disk images according to one or more customization scripts describing the customizations;
means for monitoring and saving block-level operations performed on the first identical disk image while applying the customizations to the first identical disk image; and,
means for re-using the monitored and saved block-level operations for concurrent or simultaneous application to other N−1 identical disk images to be similarly customized,
wherein the N identical disk images becomes the N customized disk images after performing the customizations and the similar customizations.

In a further embodiment, the monitored and saved block-level operations includes one or more of:

a file offset within a file system in the first identical disk image, the file offset indicating a specific location in the file system where the customizations applied;

an inode identity corresponding to the specific location where the customization applied; and a block offset in the first identical disk image, the block offset indicating a particular location where the customization applied.

In a further embodiment, the similar customizations are changes that do not depend on a particular customization script.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

DETAILED DESCRIPTION OF THE PREFERRED EMBODIMENTS

Figure 1A:
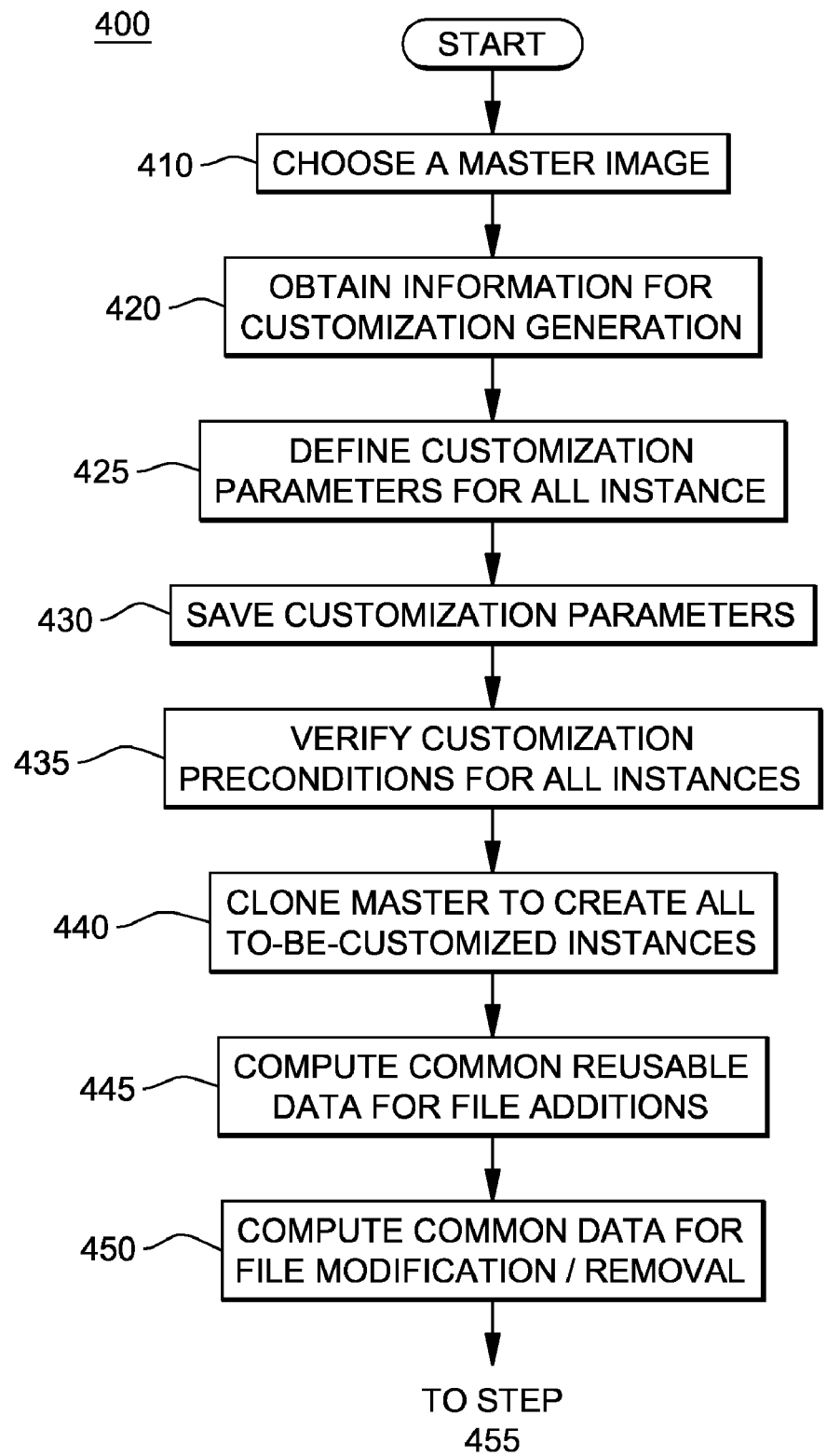
FIGS. 1A-1B illustrate a flow chart including method steps employed according to one embodiment of the present invention.

In the present invention, image management (IM) refers to a management of virtual disk images. In a virtualization environment, e.g., VMWare, it is expected that the number of virtual machines exceeds the number of physical machines (e.g., computing devices) and that the number of disk images exceeds the number of active virtual machines (i.e., virtual machines currently operating). In one embodiment, IM refers to a deployment of a new virtual machine (VM) based on an existing master disk image. Instead of allocating an empty VM and installing software on it (like on a physical machine), IM clones the master image and creates a new VM from the clone (the master disk image is cloned to avoid destruction of its content by operating the new VM to use the cloned disk image as a disk). Cloning produces an identical copy of the master disk image. If several VMs are created from a same master disk image, the created VMs are identical. These VMs may have a same name, license number, MAC (Media Access Control) address, root password, etc, because the VMs obtains their identities from their disks. From a VM's perspective, everything is written as files inside its disk. When a user wants to make each VM unique (i.e., customize it), then the files inside its (virtual) disk image must be changed. This customization may occur while deploying the VMs.

One embodiment of the present invention includes a system and method to efficiently customize or personalize identical disk image cloned from a master disk image by dividing the customization into two steps:

1. Analyze the customization only once. Analyzing the customization includes logical operations such as, but is not limited to: parsing a request for the customization (e.g., replacing all X with Y), searching and locating items (e.g., texts) associated with the customization request in an identical disk image or in a master disk image, deciding which operation (e.g., deletion and/or addition) needs to be applied on a specific location in an identical disk image or in a master disk image, etc. Then, all the data collected while analyzing the customization are saved, e.g., in a cache memory, and are reused. These logical operations are time-consuming and complicated procedure. Thus, by performing the analysis only once for all customizations on all cloned disk images, the customization can be performed fast and efficiently.

2. Apply the decided operation (e.g., deletion and/or addition) on the specific location in each cloned disk image. Applying the decided operation may utilize low-level file system (FS) information that was obtained while analyzing the customization. The low-level FS information may be identical for each cloned disk image. The low-level FS information includes, but is not limited to: directory information (e.g., directory structure), file names, access right for a file, a location of a file, a specific location in a file, an allocation of a new space in a disk image for a write, updating a pointer to point to the new allocated space, a size of the new allocated space, files, offset within files, block number for files, disk sector number for files, an inode (i.e., a data structure for storing basic information (e.g., a name or owner) about a file, directory, etc.).

In traditional solutions, every time customizing a cloned disk image, the low-level FS information is obtained, e.g., by analyzing the customization request. Thus, the traditional solutions perform same or similar analysis N times to obtain same or similar low-level FS information N times as the Operating System does not recognize that it continuously obtain same information. On the other hand, this mechanism according to this embodiment of the present invention obtains the low-level FS information only once by analyzing the customization request only once and then saves the obtained low-level FS information in a memory device (e.g., a cache memory). Thus, in traditional solutions, to customize N cloned disk image, there may be N-times analysis and N-times actual operations (e.g., deletion and/or addition). On the other hand, according to the mechanism of this embodiment, there may be 1 analysis and N-times actual operations. Thus, this mechanism of this embodiment enables customizing N cloned disk images concurrently or simultaneously based on low-level FS information obtained the analysis. When sequentially customizing, the mechanism of this embodiment may include 1 analysis, N-times cache memory accesses (e.g., 1 write and N−1 reads) and N-times actual operations based on the analysis. Thus, the mechanism enables mass customization efficiently and fast.

In one embodiment, to customize N customized disk images (N≧1), a computing system (e.g., a system 1600 in FIG. 2) first creates N identical disk images from a master disk image. In a further embodiment, when creating the N identical disk image from the master disk image, the computing system may multicast the master image to all destinations (i.e., send the master image to all virtual machines simultaneously). Then, the computing system mounts the N identical disk images (i.e., makes the N identical disk images ready to be customized). After mounting the N identical disk images, the computing system may apply a customization (e.g., changing an IP address configured in an identical disk image) to a first identical disk image among the N identical disk images according to one or more customization scripts provided from users (e.g., system administrators). The customization scripts may describe how to customize an identical disk image.

While applying the customization to the first identical disk image, the computing system may monitor and save block-level operations (i.e., operations performed directly on disk blocks—read, write, skip; e.g., operations performed under SCSI (Small Computer System Interface) or like device interface protocol). Then, the computing system applies the monitored and saved block-level operations on other N−1 identical disk images for same or similar customizations. In an example embodiment, a common UNIX® data definition program "dd" is implemented having methods for performing the low-level operations (e.g., low-level copying or conversion; e.g., machine code operation) on raw data in a disk. "Same" customizations refer to applying a same block-level operation at a same block for a same size with a same value or content in N−1 identical disk images, as the computing system applies the same block-level operation at the same block for the same size with the same value or content in the first identical disk image. "Similar" customizations refer to changes that do not depend on a particular customization script. In other words, similar customizations refer to applying a same block-level operation at a same block for a same size with each different value or content in each N−1 identical disk image. Setting up each different hostname, IP address and password in each identical disk image may be examples of similar customizations.

After applying the similar customizations on N−1 identical disk images, the N identical disk images (the first disk image and N−1 identical disk images) become N customized disk images. Furthermore, at least N identical VMs operated in the N identical disk images becomes at least N customized VMs by operating based on N customized disk images having different hostnames, IP address, passwords, etc.

In a further embodiment, the users may write the customization scripts in a well-known scripting languages, e.g., Perl, Bash, etc. The computing system may execute the customization scripts to customize one or more identical disk image (s).

In a further embodiment, before executing the customization scripts, the users or the computing system may modify the customization scripts to enable executing the customization scripts concurrently or simultaneously on the N identical disk images, e.g., by separating an analysis step (i.e., analyzing the customization only once) from an actual change step (i.e., applying the decided operation), and to reuse the monitored and saved block-level operations.

In a further embodiment, prior to modifying the customization scripts, the users or the computing system may perform a necessary search (e.g., checking a current state of the computing system, a place of a current IP address encoded). Prior to modifying the customization scripts, the users or the computing system may further perform dependency checks. For example, the customization scripts may call (execute) other programs, so the customization scripts depend on the existence of these programs. The scripts may also include a logic that depends on a current state of the computing system (e.g., "if the current value is X then do Y")—these dependencies can be checked once for all cloned disk images, since the disk images being customized are identical before being customized. After modifying the customization scripts, the users or computing system may verify whether the modified customization scripts can be executed correctly.

Example 1

In one non-limiting example, there is now described an example customization script that may be implemented to replace a current IP (e.g., an ethernet address) with a new address on a Linux machine, for example. The example script may include steps implemented by the host for: 1) aborting if there is no ethernet network device; 2) finding the Linux version; 3) finding networking files for the specific Linux version; 4) determining whether the machine to be cloned is currently configured for DHCP (Dynamic Host Configuration Protocol), and if so, then removing the DHCP information and creating empty static IP entries; 5) finding a current network mask and gateway; 6) verifying that the new IP is a valid IP and belongs to the subnet; 7) finding the current IP entry; 8) replacing the current IP entry with the new IP; and, 9) determining whether a web application server service is enabled and, if so, then performing sub-steps: a) find which type of server; b) if not supported by customization script then log warning and skip; c) if not configured for static IP and ethernet then skip; d) locating current IP entries in server customization files; and, e) replacing current IP with new IP. Further, the script includes the step 10) of repeating all of step 9) and sub-steps for other services that encode current IP, e.g., DB.

Example 2

In a further non-limiting example, there is now provided an example modified customization script. As described herein, this modified script may be implemented for all instances; after one run that recorded reusable data. The example script may include steps implemented by the host for: 1) performing enumerated step 4 from example 1 before cloning (if needed); 2) performing enumerated step 6 from example 1 for all instance IPs including the sub-steps of a) using recorded current mask and gateway; and, b) optimizing for mass check—e.g., do bitwise AND on all masked bits for all checked IPs and compare to GW, one-by-one check only on failure (this will ensure better performance for the common case of all input IPs are valid); 3) performing enumerated step 8 from example 1 for all including a sub-step a) of using recorded block-level information to go directly (in each clone) to relevant files and at correct offset; and 4) performing only step 9e for all (if needed) including a sub-step a) using recorded block-level information to go directly (in each clone) to relevant files and at the correct offset; and 5) performing enumerated step 10 from example 1 for other services that encode current IP, e.g., DB.

Example 3

In a further non-limiting example an example modified customization script may be implemented once for recording reusable data and includes steps of: 1) running all steps of unmodified script of example 1 except the steps of: 2) performing enumerated step 4 from example 1 once (if needed) and use modified clone as master for rest; 3) performing enumerated step 6 from example 1 for all instance IPs including sub-steps: a) using the recorded current mask and gateway; and b) optimizing for mass check—e.g., by performing bitwise AND on all masked bits for all checked IPs and compare to GW, one-by-one check only on failure (will have better performance for the common case of all input IPs being valid); 4) modifying enumerated step 8 from example 1 and recording block-level information of relevant files and offsets; 5) performing step 9e for all (if needed) including sub-step of recording block-level information of relevant files and offsets; and, 6) performing enumerated step 10 from example 1 for other services that encode current IP, e.g., DB.

In a further embodiment, the computing system optimizes CoW (Copy-On-Write) operations for the N identical disk images, e.g., by adding "make n copies" option to CoW operation. A typical CoW operation may be copying A to B. The typical CoW operation may create a logical copy instead of a physical copy to save copying time. In the typical CoW operation, to copy a file, there may be loading the file and copying the file. In the typical CoW operation, these loading and copying may be performed each N-times to create N copies of the file. Thus, the typical CoW operation requires loading N-times and copying N-times. However, "make n copies" option in this embodiment, which may be implemented as a plug-in or API (Application Programming Interface) to the typical CoW operation, performs loading the file once and copying the file N-times to create N copies of the file. Thus, the computing system performs 1 loading, N-times copying to create N copies.

In a further embodiment, the computing system optimizes CoW operations for the N identical disk images by optimizing metadata operations for the CoW operations. The typical CoW operation includes metadata operations such as setting up copying various metadata, verifying copying parameters, allocating a target space, etc. In traditional solutions, these metadata operations are done independently for each identical disk image, i.e., the traditional solutions perform setting up N-times, verifying N-times, and allocating N-times to create N identical copies. In the invention, the computing system performs setting up only once, verifying the parameters only once, and allocating a target space for all copies at once to create N identical copies simultaneously.

In a further embodiment, the block-level operation may include, but is not limited to: a file offset within a file system in an identical disk image (e.g., the first identical disk image) (The file offset may indicate a specific location in the file system or in the identical disk image where the customization applied), an inode identity corresponding to a specific location in the identical disk image where the customization applied, and a block offset in the identical disk image (the block offset may indicate a particular location where the customization applied).

In a further embodiment, to apply the customization on the first identical disk image, the computing system reads a first disk block from the master disk image to a buffer. Then, the computing system modifies the first disk block in the buffer according to the customization written in the one or more executed customization scripts. The computing system overwrites the first disk block in the first identical disk image with the modified disk block in the buffer. At the same time, the computing system may store the modified disk block in the buffer before starting to apply the similar customizations on other N-1 identical disk images, e.g., by using the block-level operations. To customize the N-1 identical disk images, the computing system modifies the stored disk block according to the similar customizations written in the one or more customization scripts, e.g., by using the block-level operations which were monitored while applying the customization on the first identical disk image. Then, the computing system overwrites the first disk block in each identical disk image with each modified disk block in the buffer.

In a further embodiment, when overwriting the first disk block in the N-1 identical disk images, the computing system may bypass a file system in the N-1 identical disk images and directly write the modified disk block to a location of the first disk block in the N-1 identical disk images, e.g., using the UNIX "dd" operation. The computing system might monitor the location of the first disk block while applying the customization on the first identical disk image.

In a further embodiment, the computing system customizes the N-1 identical disk images concurrently or simultaneously. For example, the computing system may execute the monitored block-level operations simultaneously or concurrently on each identical disk image according to each similar customization (e.g., writing each different value at same location/block having a same size). After executing the customizing of the N-1 identical disk images and the first disk image, the N identical disk images become N customized disk images.

When customizing the N identical disk images by modifying a file X in the N identical disk images, the computing system may read the file X from the master disk image. Then, the computing system may modify the file X for the first identical disk image and overwrites the file X in the first identical disk image with the modified file, X'. At the same time, the computing system stores the modified file X' in a cache memory or a memory device. Then, the computing system modifies the file X' in the cache memory for a second identical disk image and overwrites the file X in the second identical disk with the modified file, X". The computing system may perform these modifying the file X' in the cache memory and overwriting the file X in each identical disk image with the modified file sequentially or concurrently.

Figure 1B:
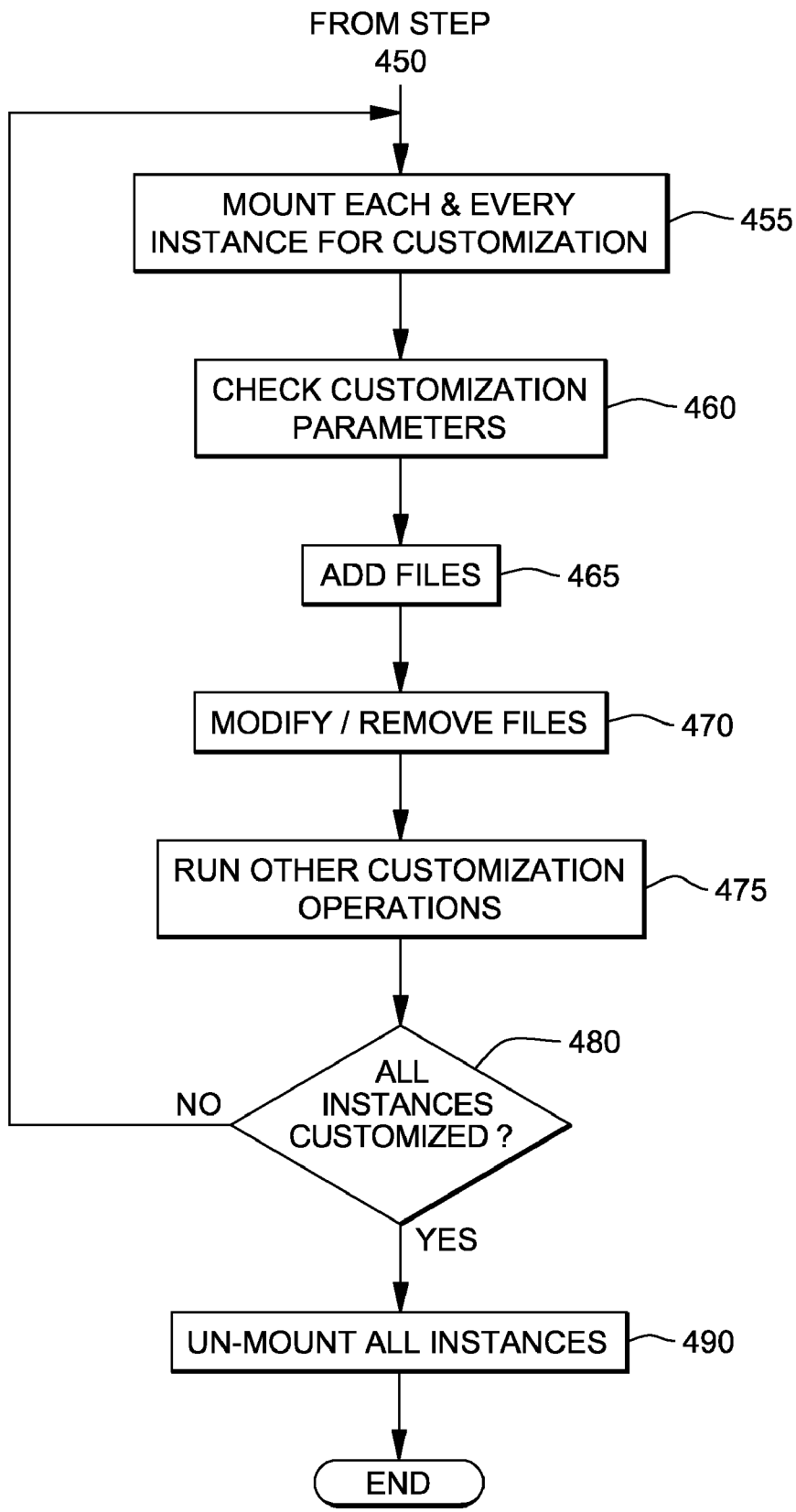

FIGS. 1A and 1B illustrates a flow chart illustrating a mechanism 400 in one embodiment of the present invention. A computing system (e.g., a system 100 in FIG. 2) and/or a virtual machine associated with or not associated with a master image may perform the method steps in FIGS. 1A-1B. In step 410, there is depicted the step of choosing a master image. As referred to herein, a master image includes a "shared" read-only template that is cloned to create instances (i.e., disk images). Then, at step 420, there is depicted the step of obtaining information for customization generation. This information may include, but is not limited to: information such as unused IP addresses, query registries for license numbers, customer IDs, name patterns, policies, etc. It is understood that in the case of obtaining query information, queries are aggregated for all instances (not a separate call for each instance). Then, at step 425, customization parameters are defined for all instances. That is, the information obtained for customization generation is used to generate the customization parameters for all instances. Then, at step 430, there is depicted the step of persisting the customization parameters, e.g., saving the customization parameters in a memory storage device. This step involves marking IP addresses and licenses as used, register generated names, saving the parameters for reuse, etc. It is understood that, as in the case of obtaining query information, actions are aggregated for all instances (not a separate call for each instance). In one embodiment, a shared storage, such as one or more interconnected hard disk drives (not shown), may be provided and used to store the application read only image (e.g., a master image) that is cloned to create instances of virtual machines.

Then, continuing to step 435, there is depicted the step of verifying customization pre-conditions for all instances. In this step, the verifying includes performing all tests on the master—the tests optimized for simultaneous operation for all instances including reading files (i.e., seek, disk access, ACLs (Access Control Lists), locks) only once, querying registry/RPM (e.g., Red Hat Package Management) DBs (Databases), verifying free space, etc. Then, at 440, there is depicted the step of cloning the master image to create all to-be-customized instances (i.e., identical disk images to be customized). This step entails creating N identical clones, optimizing operation to create all clones simultaneously rather than clone N times (e.g., pre-allocate space target, reuse CoW bitmaps, cache reads). Then, proceeding to step 445, there is performed the step of computing common reusable data for file additions. It is understood that this step may be performed once for later reuse: and includes first verifying permissions, verifying that files don't exist, allocating i-nodes, computing offsets, reading old source content (e.g., reading current content in a disk block where the content is going to be changed by performing a customization), computing new FS (File System) directory metadata. Next, at step 450, there is computed a common data for file modification/removal. This step may be performed once for later reuse and includes: verifying permissions, calculating new FS metadata, locating change point offsets (i.e., locating block offsets where a customization is to be applied), reading and parsing old content (e.g. open RPM DB, initialize tables, find fields to be modified).

Then, continuing to step 455, FIG. 1B, there is depicted a step of mounting each and every instance for customization; this step is optimized for simultaneous identical operation on N instances. The mounting methods where the file system is to be mounted may include one of either loopback FS mount (i.e., mounting a file system in each instance via a loopback device (i.e., a device allowing a disk file to be mounted as a file system)) or block-level access (i.e., directly accessing raw data in a disk without a file system). At 460, there is performed the step of checking all customization parameters for each instance, and at 465, performing the steps of adding files to be mounted. In this step, data previously computed at step 445, FIG. 1A, is re-used. Additionally, there is performed a write command (could be block-level), or a simultaneous write command to many instances (simultaneously write to all instances) which is an optimization that makes better use of cache. At step 470, there is depicted a step of modifying/removing files. In this step, data previously computed at step 450, FIG. 1A, is re-used. Additionally, this step performs computing new content from the customization parameters, which is saved in a memory device at step 430, writing modified files (could be block-level) and writing modified file system metadata. At step 475, there is performed the step of running other customization operations, e.g., by executing operations in customization scripts that cannot be re-used or aggregated. At step 480, there is depicted a step of evaluating whether all instances are customized. If all instances are not customized, the steps 460-480 are repeated until all the instances are customized (e.g., until each instance has each different IP address or each different host name). If all instances are customized, at step 480, there is performed the step of un-mounting all instances (i.e., making all the customized instances provide services to users or applications). For an optimization purpose, all the instances may be unmounted simultaneously, e.g., by performing an identical operation simultaneously for all the instances. This optimization may also enhance a lock usage, because the simultaneous un-mounting may only require one key (or one semaphore) to lock all the instances to prevent using all the instances before being customized. At the step 490, all the customized instances are actively operating. The customized instances also makes VMs operating based on the customized instances become customized VMs (e.g., each different virtual machine having different license number, different IP address, etc.).

Figure 2:
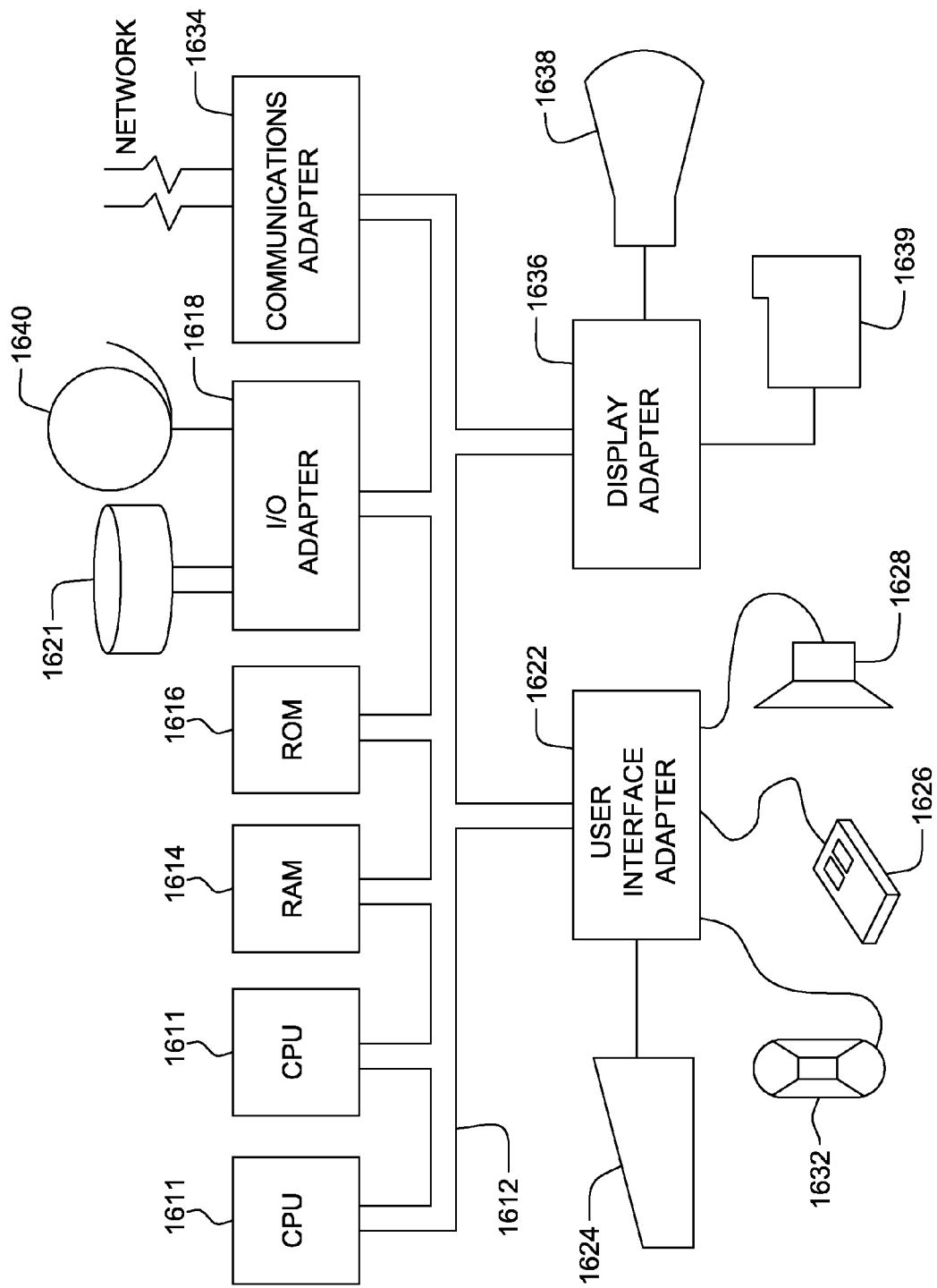
FIG. 2 illustrates a system executing the method steps (FIGS. 1A-1B) according to one embodiment of the present invention.

FIG. 2 illustrates a computing system 1600 executing or implementing the method steps in FIGS. 1A-1B in one embodiment of the present invention. The hardware configuration preferably has at least one processor or central processing unit (CPU) 1611. The CPUs 1611 are interconnected via a system bus 1612 to a random access memory (RAM) 1614, read-only memory (ROM) 1616, input/output (I/O) adapter 1618 (for connecting peripheral devices such as disk units 1621 and tape drives 1640 to the bus 1612), user interface adapter 1622 (for connecting a keyboard 1624, mouse 1626, speaker 1628, microphone 1632, and/or other user interface device to the bus 1612), a communication adapter 1634 for connecting the system 1600 to a data processing network, the Internet, an Intranet, a personal area network (PAN), etc., and a display adapter 1636 for connecting the bus 1612 to a display device 1638 and/or printer 1639 (e.g., a digital printer of the like).

In a further embodiment, the computing system 1600 may further comprise an AXE (Advanced Hex Editor) component. The AXE may create an automatic "macro" that manipulates HEX files (e.g., read an input string X, encode 5 HEX characters using an encoder Y, open file Z at an offset W, replace 5 HEX characters with an encoded string). An example of AXE can be obtained at http://www.allworldsoft.com/software/0-208-axe.htm.

Although the embodiments of the present invention have been described in detail, it should be understood that various changes, substitutions and alternations can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

The present invention may be implemented on a computer readable medium (e.g., a compact disc, a digital versatile disc, a hard disk, an optical disk, a solid state drive, etc.) embodying computer program instructions (e.g., C++, C, Java, Net, Assembly languages, binary code, etc.) being executed by a processor (e.g., IBM® PowerPC®, SUN® Sparc®, etc.) for causing a computer (e.g., a desktop, a laptop, a server, etc.) to perform one or more functions of this invention. The present invention further includes a method of deploying a computer program product including a program of instructions in a computer readable medium for one or more function of this invention, wherein, when the program of instructions is executed by a processor, the computer program product performs the one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for creating N customized disk images in a computer device, said method comprising:
    creating N identical disk images from a master disk image where N is a whole number greater than 2;
    applying customizations to a created first identical disk image among the N identical disk images according to one or more customization scripts describing the customizations, said applying comprising:
    analyzing said customizations to said created first identical disk image once, and
    determining, from said analyzing, block-level operations to be applied on specific locations in said identical disk image; and
    saving to a memory storage device, said block-level operations performed on the first identical disk image while applying the customizations to the first identical disk image; and
    subsequently re-using the saved block-level operations for concurrent or simultaneous application to other N−1 identical disk images to be similarly customized,
    wherein the N identical disk images becomes the N customized disk images after performing the customizations and the similar customizations.

2. The method according to claim 1, further comprising:
    receiving the one or more customization scripts from a user, wherein said
    analyzing said customizations once comprises:
        parsing a customization request; and
        searching and locating blocks associated with the parsed customization request in said first identical disk image.

3. The method according to claim 1, further comprising:
    modifying the one or more customization scripts to be executed simultaneously on the N identical images by re-using the saved block-level operations.

4. The method according to claim 3, further comprising:
    performing a necessary search to determine a state of said computer device prior to any modification on the one or more customization scripts;
    performing dependency checks to determine existence of programs called by said script prior to any modification on the one or more customization scripts; and
    verifying whether the modified one or more customization scripts can be executed correctly.

5. The method according to claim 1, further comprising:
    performing a CoW (Copy-On-Write) operation optimized for creating the N identical disk images.

6. The method according to claim 1, wherein the saved block-level operations includes one or more of:
    a file offset within a file system in the first identical disk image, the file offset indicating a specific location in the file system where the customizations applied;
    an i-node identity corresponding to the specific location where the customization applied; and
    a block offset in the first identical disk image, the block offset indicating a particular location where the customization applied.

7. The method according to claim 1, wherein
    the applying customizations to a first identical disk image comprises:
    reading a first disk block from the master disk image to a buffer;
    modifying the first disk block in the buffer according to the customizations; and
    overwriting the first disk block in the first identical disk image with the modified disk block in the buffer.

8. The method according to claim 1, wherein the applying the saved block-level operations on other N−1 identical disk images comprises:
    storing the modified disk block in the buffer;
    modifying the stored disk block according to the similar customizations; and
    overwriting the first disk block in the N−1 identical disk images with the modified stored disk block.

9. The method according to claim 8, wherein the overwriting the first disk block in the N−1 identical disk images bypasses a file system in the N−1 identical disk images and directly writes the modified stored disk block to a location of the first disk block in the N−1 identical disk images.

10. The method according to claim 1, wherein the similar customizations are changes that do not depend on a particular customization script.

11. A system, implemented in a computer device, for creating N customized disk images comprising:
    means for creating N identical disk images from a master disk image where N is a whole number greater than 2;
    means for applying customizations to a first identical disk image among the N identical disk images according to one or more customization scripts describing the customizations, said means for applying performing:
    analyzing said customizations to said created first identical disk image once; and
    determining, from said analyzing, block-level operations to be applied on specific locations in said identical disk image;
    means for saving to a memory storage device, said block-level operations performed on the first identical disk image while applying the customizations to the first identical disk image; and
    means for subsequently re-using the saved block-level operations for concurrent or simultaneous application to other N−1 identical disk images to be similarly customized,
    wherein the N identical disk images becomes the N customized disk images after performing the customizations and the similar customizations.

12. The system according to claim 11, further comprising:
    means for receiving the one or more customization scripts from users, wherein said analyzing comprises:

parsing a customization request; and searching and locating texts associated with the parsed customization request in said first identical disk image.

13. The system according to claim 11, further comprising:
means for modifying the one or more customization scripts to be executed simultaneously on the N identical images and to reuse the saved block-level operations.

14. The system according to claim 13, further comprising:
means for performing a necessary search to determine a state of said computer device prior to any modification on the one or more customization scripts;
means for performing dependency checks to determine existence of programs called by said script prior to any modification on the one or more customization scripts; and
means for verifying whether the modified one or more customization scripts can be executed correctly.

15. The system according to claim 11, wherein said means for creating N identical disk images further comprises:
means for performing a CoW (Copy-On-Write) operation optimized for creating the N identical disk images.

16. The system according to claim 11, wherein the saved block-level operations includes one or more of:
a file offset within a file system in the first identical disk image, the file offset indicating a specific location in the file system where the customizations applied;
an inode identity corresponding to the specific location where the customization applied; and
a block offset in the first identical disk image, the block offset indicating a particular location where the customization applied.

17. The system according to claim 11, wherein the means for applying customizations to a first identical disk image comprises:
means for reading a first disk block from the master disk image to a buffer;
means for modifying the first disk block in the buffer according to the customizations; and
means for overwriting the first disk block in the first identical disk image with the modified disk block in the buffer.

18. The system according to claim 11, wherein the means for applying the saved block-level operations on other N−1 identical disk images comprises:
means for storing the modified disk block in the buffer;
means for modifying the stored disk block according to the similar customizations; and
means for overwriting the first disk block in the N−1 identical disk images with the modified stored disk block.

19. The system according to claim 18, wherein the means for overwriting the first disk block in the N−1 identical disk images bypasses a file system in the N−1 identical disk images and directly writes the modified stored disk block to a location of the first disk block in the N−1 identical disk images.

20. The system according to claim 11, wherein the similar customizations are changes that do not depend on a particular customization script.

21. A computer readable medium storing computer program instructions being executed by a processor for causing a computer to perform method steps for creating N customized disk images, said method steps comprising the steps of claim 1.

22. A method of deploying a computer program product including a program of instructions in a computer readable medium for creating N customized disk images, wherein, when the program of instructions is executed by a processor, the computer program product performs the steps of claim 1.

* * * * *